United States Patent [19]

Aibe et al.

[11] 4,212,852
[45] Jul. 15, 1980

[54] METHOD OF DEODORIZING GAS CONTAINING HYDROGEN SULFIDE AND AMMONIA AND/OR AMINES

[75] Inventors: Toshio Aibe, Toyonaka; Kiyoshi Itoga, Kawanishi, both of Japan

[73] Assignee: Takeda Chemical Industries, Ltd., Japan

[21] Appl. No.: 905,521

[22] Filed: May 5, 1978

[30] Foreign Application Priority Data

May 6, 1977 [JP] Japan .................................. 52/52329
Nov. 25, 1977 [JP] Japan ................................ 52/141836

[51] Int. Cl.² .......................... B01J 8/00; B01J 23/22; B01J 23/28; B01J 23/30
[52] U.S. Cl. ................................ 423/230; 423/237; 423/239; 423/244; 423/245; 252/445; 422/4; 422/5
[58] Field of Search ................ 21/53, 55; 23/288 F; 422/4, 5, 177; 252/445, 447; 423/230, 244, 245, 224, 235, 237, 239 R, 239 A

[56] References Cited

U.S. PATENT DOCUMENTS

| 1,771,396 | 7/1930 | Caplan | 21/53 |
| 2,430,861 | 11/1947 | Carpenter et al. | 21/53 |
| 3,299,620 | 1/1967 | Hollingworth | 21/53 |
| 3,732,075 | 5/1973 | Acaba | 21/55 |
| 3,804,942 | 4/1974 | Kato et al. | 21/53 |
| 3,884,804 | 5/1975 | Robinson et al. | 21/55 |
| 3,887,683 | 6/1975 | Abe et al. | 423/235 |
| 3,911,080 | 10/1975 | Mehl et al. | 423/224 |
| 3,972,678 | 8/1976 | Nakshbendi | 21/55 |
| 4,089,930 | 5/1978 | Kittrell et al. | 423/351 |

FOREIGN PATENT DOCUMENTS

| 2241340 | 3/1973 | Fed. Rep. of Germany | 21/53 |
| 51-18980 | 2/1976 | Japan | 21/55 |
| 52-136895 | 11/1977 | Japan . | |

Primary Examiner—Bradley R. Garris
Attorney, Agent, or Firm—Wenderoth, Lind & Ponack

[57] ABSTRACT

Malodorous gas containing (1) ammonia and/or amines and (2) hydrogen sulfide is deodorized by reacting the gas with oxygen in the presence of activated carbon having supported thereon at least a metal compound selected from the group consisting of vanadium compounds, molybdenum compounds and tungsten compounds.

2 Claims, No Drawings

METHOD OF DEODORIZING GAS CONTAINING HYDROGEN SULFIDE AND AMMONIA AND/OR AMINES

This invention relates to a method for deodorizing a malodorous gas containing hydrogen sulfide and ammonia and/or amines.

In such places as a manure plant, sewage disposal plant, incinerating plant, animal quarters and so forth, malodorous gases containing hydrogen sulfide, mercaptans and other compounds of sulfur and compounds of nitrogen such as ammonia and amines, for instance, are inevitably produced. Meanwhile, a number of procedures have been developed for an adsorptive elimination of malodorous components from a gas by means of activated carbon. Whilst ordinary activated carbon adsorbs sulfur compounds which are among such malodorous components, it does not, however, substantially adsorb ammonia and amines, especially lower amines, thus failing to thoroughly remove the malodorous components from such gases insofar as the carbon as such is employed alone. For the purpose of removing all of such malodorous components, it has been proposed to employ activated carbon in combination with adsorbents for ammonia and amines. Since the adsorbents intended for such removal of ammonia and amines are those based on sulfonated carbon, iron sulfate and so on, they have had problems in connection with adsorptive capacities, water resistance, etc., thus being found to be not fully satisfactory.

The research undertaken by us to overcome those disadvantages has shown that by means of an activated carbon having as supported thereon a metal compound selected from the group consisting of compounds of vanadium, molybdenum and tungsten in the presence of oxygen, all of ammonia, amines and hydrogen sulfide can be removed from a malodorous gas containing such components, even without the employment of an adsorbent for ammonia and amines.

This invention is, therefore, concerned with a method for deodorizing a malodorous gas, which comprises contacting the malodorous gas containing (1) ammonia or amines and (2) hydrogen sulfide with activated carbon having supported thereon at least a metal compound selected from the group consisting of vanadium compounds, molybdenum compounds and tungsten compounds in the presence of oxygen (hereinafter refered to as metal compound-supporting activated carbon).

As the activated carbon on which the metal compound is to be supported, an activated carbon produced from charcoal, coal, coke, coconut shell, resin or the like by a conventional producing method for activated carbon and having 200 to 2000 m²/g of BET surface area is employable. A carbonaceous molecular sieve having micropores with diameters in the range of 4 to 6 Angstrom units prepared by the method disclosed in the Japanese published examined patent application (Tokkyo Kōhō) No. 37036/1974 is also employable.

In the metal compound-supporting activated carbon employed in the present invention, the metal compounds (i.e. vanadium compounds, molybdenum compounds and tungsten compounds) are supported as their oxides, oxo acids or salts of the oxo acid. More concretely, there may be mentioned such oxides as $V_2O_2$, $V_2O_3$, $V_2O_4$, $V_2O_5$, $MoO_2$, $Mo_2O_3$, $MoO_3$, $WO_2$, $WO_3$, etc., such oxo acids as $HVO_3$, $H_4V_2O_7$, $H_2MoO_4$, $H_2WO_4$, etc., alkali metal salts such as $Na_2VO_4$, $Na_4O_2V$, $K_2MoO_4$, $Na_2MoO_4$, $Na_2Mo_2O_7$, $Na_2Mo_3O_{10}$, $Na_2Mo_4O_{13}$, $Na_2Mo_8O_{25}$, $Na_2Mo_{10}O_{13}$, $K_2WO_4$, $K_2WO_{13}$, $K_2W_7O_{24}$, $Na_2W_7O_{24}$, $Na_2WO_4$, etc., and ammonium salts such as $NH_4VO_3$, $(NH_4)_2MoO_4$, $(NH_4)_6Mo_7O_{24}$, $(NH_4)_2W_4O_{13}$, $(NH_4)_6W_7O_{24}$, etc.

The metal compound supporting activated carbon employed in the present invention can be produced by having the metal compound supported on the surface of activated carbon. The procedure may usually comprise either impregnating or spraying the activated carbon with a solution or suspension of the metal compound in water or an organic solvent. The resulting mixture is usually dried by heating, and then, if necessary, calcining.

The metal compound-supporting activated carbon can also be produced by admixing uniformly the metal compound with the raw material for said ordinary activated carbon, for example, by admixing a solution or suspension of the metal compound in water or organic solvent with the raw material, and then carbonizing and activating the resultant mixture of the conventional process for the production of activated carbon.

The amount of said metal compound which is to be supported by activated carbon is not less than 1/5,000 or, preferably in the range of 1/1,000 to 1/5 as the corresponding metal or metals based on the weight of the activated carbon.

The concentration of the solution or suspension is decided by calculating from the amount of the metal compound to be supported on activated carbon and the amount of the solution to be employed for the spray or impregnation.

The calcination is usually carried out in an optional gaseous atmosphere, e.g. an inert gas or a reducing gas at a temperature ranging 200° to 950° C. for 0.5 to 40 hours.

As the metal compound-supporting activated carbon in the present invention, the activated carbon supporting oxide of the metal is advantageously employed.

The activated carbon on which the oxide of the metal is supported can also be produced by having the metal compound convertible to oxide by calcination, supported on the surface of activated carbon and then calcining.

As examples of those metal compounds convertible to oxides, there may be mentioned oxo acids of the metal, ammonium salts as mentioned above, and such sulfate as $VOSO_4$, etc.

When any of the metal compounds convertible to oxide by calcination are admixed with a raw material for activated carbon and then the mixture is subjected to carbonization and activation procedure, the activated carbon having as supported thereon oxide of the metal is obtained.

The malodorous components which are to be removed by the method of this invention are ammonia, amines and hydrogen sulfide. Said amines may for example be alkylamines such as methylamine, ethylamine, propylamine, etc.; dialkylamines such as dimethylamine, diethylamine, methylethylamine, etc.; trialkylamines such as trimethylamine, dimethylethylamine, triethylamine, etc.; hydrazine; alkylenediamines such as methylenediamine, etc.; hydroxylamine and hydroxylalkylamines such as methanolamine, ethanolamine, etc.; aromatic amines such as aniline; and nitrogen-containing heterocyclic compounds such as pyridine, pyrrole, indole, skatole, etc.

When malodorous substances such as mercaptans, sulfides, hydrocarbons, aldehydes, carboxylic acids, phenols, etc. are contained in the malodorous gas together with the malodorous components i.e. ammonia, amines and hydrogen sulfide, these malodorous substances can also be removed by carring out the present invention.

When ordinary activated carbon not supporting thereon any metal compound is employed, the hydrogen sulfide reacts with oxygen and is precipitated as elemental sulfur on the activated carbon, with the result that ammonia and amines are not removed.

In the method of this invention, a gas containing hydrogen sulfide, ammonia and amines is contacted with said metal compound-supporting activated carbon. In this process, the hydrogen sulfide is oxidized to sulfuric acid which, in turn, reacts with ammonia and/or amines to yield the corresponding sulfates, which are as such adsorbed on the activated carbon.

$$H_2S + 2O_2 \rightarrow H_2SO_4$$

$$2NH_3 + H_2SO_4 \rightarrow (NH_4)_2SO_4$$

$$2R_3N + H_2SO_4 \rightarrow (R_3N)_2 \cdot H_2SO_4$$

(wherein R is hydrogen, alkyl or the like)

Thus, when the gas contains a stoichiometrically excess amount of ammonia and amines with respect to its hydrogen sulfide content, all of them cannot be converted to sulfates. In other words, the portions of said ammonia and amines which are not converted to sulfates will not be removed In such cases, if sulfur dioxide gas ($SO_2$) is added to the malodorous gas, the former gas coming in contact with the activated carbon reacts with oxygen and water to transform itself into sulfuric acid. Thus, by adding a necessary amount of $SO_2$, the ammonia and amines can be completely removed.

As will be apparent from the reaction formulas given hereinbefore, the method of this invention must be practiced in the presence of oxygen gas. Moreover, when $SO_2$ is added to the malodorous gas to be treated, 0.5 mol of oxygen and 1 mol of water must be supplied per mol of $SO_2$. A large majority of malodorous gases contain adequate amounts of oxygen and water and need not be specially supplemented with these reactants. If, however, such supplementation is necessary, such additional supplies of oxygen and water may be provided by mixing the malodorous gas with moisture-laden air, for instance.

In contacting a malodorous gas with a metal compound-supporting activated carbon according to this invention, the contacting temperature may range from 0° to 150° C. and, preferably, between 5° and 100° C. The gas-solid contact between said gas and carbon may be effected by any of moving-bed, fluidized bed, fixed bed or other method.

The activated carbon used in the removal of malodorous components can be regenerated by a conventional procedure such as solvent washing, thermal desorption or the like and can then be reused for the removal of malodorous gas components.

The solvent washing may be carried out by means of water, an aqueous solution of alkali or an organic solvent. Particularly because, in the method of this invention, it is not elemental sulfur but sulfuric acid or sulfate that is produced on the surface of activated carbon, the carbon can be easily regenerated by aqueous washing. The washing of the used carbon is carried out at a temperature between 20° and 90° C., using a solvent at least twice the weight of carbon.

The thermal desorption process is carried out at a temperature between 250° and 950° C. in an inert gaseous atmosphere such as nitrogen gas, carbon dioxide gas, flue gas, etc., a reducing gas such as carbon monoxide, hydrogen gas, ammonia gas, etc. or water vapor.

The following examples are further illustrative of the present invention, it being, of course, to be understood that the invention is by no means limited to such specific embodiments.

EXAMPLE 1

Preparation of the activated carbon having as supported thereon the metal compound Control:
A: Granular activated carbon whose BET surface area is 1150 m²/g.

Present invention:
B: The granular activated carbon A was sprayed with aqueous solution of $NH_4VO_3$ and calcined at 400° C. in nitrogen gas for one hour.
C: The granular activated carbon A was sprayed with an aqueous solution of $(NH_4)_6Mo_7O_{24}$ and dried at 100° C.
D: The granular activated carbon A was sprayed with aqueous solution of $(NH_4)_{10}W_{12}O_{41}$ and dried at 100° C.

The amount of each metal compound supported on the activated carbons B, C and D was 1 weight % as the metal.

Removal of the malodorous components

Each of the activated carbon A and the metal compound-supporting activated carbons B, C and D was packed into a 4.1 cm($\phi$) column and an air (temperature: 25° C.; relative humidity: 80%) containing 35 ppm of $H_2S$, 15 ppm of $NH_3$ and 5 ppm of $(CH_3)_3N$ was passed through the column at a linear velocity of 40 cm/sec. to measure the percent removal of each of $H_2S$, $NH_3$ and $(CH_3)_3N$. The results are set forth in Table 1.

Table 1

| | Percent removals of $H_2S$, $NH_3$ and $(CH_3)_3N$ at the time-points below | | | | | |
|---|---|---|---|---|---|---|
| | 5 hours | | | 10 hours | | |
| | $H_2S$ | $NH_3$ | $(CH_3)_3N$ | $H_2S$ | $NH_3$ | $(CH_3)_3N$ |
| Control: Untreated activated carbon A | 100 | 54 | 60 | 100 | 25 | 53 |
| This invention V-supporting carbon B | 100 | 100 | 100 | 100 | 100 | 100 |
| Mo-supporting carbon C | 100 | 100 | 100 | 100 | 100 | 100 |
| W-supporting carbon D | 100 | 100 | 100 | 100 | 100 | 100 |

EXAMPLE 2

Each of activated carbon A and V-, Mo- and W-compound-supporting carbons (B, C and D) was packed into a 4.1 cm($\phi$) column and an air (temperature: 25° C.; relative humidity: 80%) containing 35 ppm of $H_2S$, 5 ppm of $CH_3SH$, 10 ppm of $NH_3$ and 5 ppm of $(CH_3)_3N$ was passed through the column at a linear velocity of 40 cm/sec. to determine the percent removals of $H_2S$, $CH_3SH$, $NH_3$ and $(CH_3)_3N$. The results are set forth in Table 2.

Table 2

| | | | Percent removals of $H_2S$, $CH_3SH$, $NH_3$ and $(CH_3)_3N$ | | | |
| --- | --- | --- | --- | --- | --- | --- |
| | | | $H_2S$ | $CH_3SH$ | $NH_3$ | $(CH_3)_3N$ |
| Control | Untreated carbon A | 5 hrs.later | 100 | 97 | 59 | 63 |
| | | 10 hrs.later | 99 | 95 | 34 | 55 |
| This invention | V-supporting carbon B | 5 hrs.later | 100 | 100 | 100 | 100 |
| | | 10 hrs.later | 100 | 100 | 100 | 100 |
| | Mo-supporting carbon C | 5 hrs.later | 100 | 100 | 100 | 100 |
| | | 10 hrs.later | 100 | 100 | 100 | 100 |
| | W-supporting | 5 hrs.later | 100 | 100 | 100 | 100 |

Table 2-continued

| | | Percent removals of $H_2S$, $CH_3SH$, $NH_3$ and $(CH_3)_3N$ | | | |
| --- | --- | --- | --- | --- | --- |
| | | $H_2S$ | $CH_3SH$ | $NH_3$ | $(CH_3)_3N$ |
| carbon D | 10 hrs.later | 100 | 100 | 100 | 100 |

What is claimed is:

1. A method for deodorizing malodorous gas which comprises reacting a malodorous gas containing (1) ammonia and/or amines and (2) hydrogen sulfide, wherein the hydrogen sulfide is in stoichiometric excess with respect to the ammonia and/or amines, with oxygen in the presence of activated carbon having supported thereon at least a metal compound selected from the group consisting of vanadium compounds, molybdenum compounds and tungsten compounds.

2. A method as claimed in claim 1, wherein the malodorous gas further contains sulfur dioxide, the total amount of sulfur dioxide and hydrogen sulfide being in stoichiometric excess with respect to the total content of ammonia and/or amines.

* * * * *